United States Patent
Lien et al.

(10) Patent No.: US 10,901,480 B2
(45) Date of Patent: Jan. 26, 2021

(54) POWER SUPPLY CIRCUITS, WEARABLE DEVICES AND METHODS FOR PROVIDING POWER SUPPLY TO A WEARABLE DEVICE

(71) Applicant: RAZER (ASIA-PACIFIC) PTE. LTD., Singapore (SG)

(72) Inventors: Jian Yao Lien, Singapore (SG); Chee Oei Chan, Singapore (SG)

(73) Assignee: RAZER (ASIA-PACIFIC) PTE. LTD., Singapore (SG)

( * ) Notice: Subject to any disclaimer, the term of this patent is extended or adjusted under 35 U.S.C. 154(b) by 0 days.

(21) Appl. No.: 16/484,433

(22) PCT Filed: Feb. 16, 2017

(86) PCT No.: PCT/SG2017/050068
§ 371 (c)(1),
(2) Date: Aug. 7, 2019

(87) PCT Pub. No.: WO2018/151665
PCT Pub. Date: Aug. 23, 2018

(65) Prior Publication Data
US 2019/0369701 A1  Dec. 5, 2019

(51) Int. Cl.
*G06F 1/3212* (2019.01)
*G06F 1/3237* (2019.01)
(Continued)

(52) U.S. Cl.
CPC .......... *G06F 1/3212* (2013.01); *G06F 1/3237* (2013.01); *G06F 1/3293* (2013.01); *G06F 1/163* (2013.01); *G06F 1/263* (2013.01)

(58) Field of Classification Search
USPC .......................................... 307/43
See application file for complete search history.

(56) References Cited

U.S. PATENT DOCUMENTS

| 5,701,597 A | 12/1997 | Nakanishi et al. |
| 6,545,445 B1 | 4/2003 | McDermott et al. |

(Continued)

FOREIGN PATENT DOCUMENTS

WO    WO 2017/023511 A1    2/2017

OTHER PUBLICATIONS

Extended European Search Report dated Jan. 23, 2020, 11 pages, for the corresponding European Patent Application No. 17896626.3.
(Continued)

*Primary Examiner* — Rexford N Barnie
*Assistant Examiner* — Xuan Ly
(74) *Attorney, Agent, or Firm* — Polsinelli PC

(57) ABSTRACT

According to various embodiments, there is provided a power supply circuit including: a power switch configured to activate one of a primary power source or a secondary power source based on a state of charge of the secondary power source; wherein the primary power source is configured to, when activated, power a low power component; and wherein the secondary power source is configured to, when activated, power the low power component and a high power component; and a clock switch configured to provide a clock signal to the high power component based on the state of charge of the secondary power source.

17 Claims, 5 Drawing Sheets

(51) Int. Cl.
   *G06F 1/3293* (2019.01)
   *G06F 1/16* (2006.01)
   *G06F 1/26* (2006.01)

(56) References Cited

U.S. PATENT DOCUMENTS

| | | | |
|---|---|---|---|
| 7,388,349 | B2 | 6/2008 | Elder et al. |
| 8,004,237 | B2 | 8/2011 | Manor et al. |
| 8,179,093 | B2 | 5/2012 | Idzik et al. |
| 8,791,600 | B2 | 7/2014 | Soar |
| 8,970,388 | B2 | 3/2015 | Trock et al. |
| 9,018,893 | B2 | 4/2015 | Trock et al. |
| 9,214,710 | B1 | 12/2015 | Cowen |
| 2009/0306485 | A1 | 12/2009 | Bell |
| 2010/0114235 | A1 | 5/2010 | Jiang et al. |
| 2012/0091816 | A1 | 4/2012 | Liu et al. |
| 2014/0049397 | A1 | 2/2014 | Trock et al. |
| 2014/0265604 | A1 | 9/2014 | Mergener |
| 2014/0277277 | A1* | 9/2014 | Gordon .................. A61N 1/378 607/59 |
| 2016/0066113 | A1* | 3/2016 | Elkhatib ............... G06F 1/3287 381/56 |

OTHER PUBLICATIONS

International Search Report and Written Opinion, dated Nov. 16, 2017, for the corresponding International Application No. PCT/SG2017/050068 in 11 pages.

E. Macii, et al: "Integrating Clock Gating and Power Gating for Combined Dynamic and Leakage Power Optimization in Digital CMOS Circuits", $11^{th}$ Euromicro Conference on Digital System Design Architectures, Methods and Tools, 2008, pp. 298-303.

* cited by examiner

POWER SUPPLY CIRCUITS, WEARABLE DEVICES AND METHODS FOR PROVIDING POWER SUPPLY TO A WEARABLE DEVICE

TECHNICAL FIELD

Various embodiments relate to power supply circuits, wearable devices and methods for providing power supply to a wearable device.

BACKGROUND

Wearable technology has been increasingly integrated into our daily lives. Today, wearable devices perform many different functions, ranging from telling time, providing telecommunications, playing audiovisual signals, monitoring health statistics to tracking our activities. Often, a single wearable device is able to perform multiple functions, so that a user need not carry many wearable devices with him. As a result, the power consumption rate of wearable devices may be considerably higher as compared to a single-function device such as a simple digital watch. At the same time, it is generally desirable for the wearable device to have an extended battery life so that it does not need to be frequently taken off from the user for charging. Therefore, there is a need for a power supply circuit that can provide uninterrupted power supply for extended time durations.

SUMMARY

According to various embodiments, there may be provided a power supply circuit including: a power switch configured to activate one of a primary power source or a secondary power source based on a state of charge of the secondary power source; wherein the primary power source is configured to, when activated, power a low power component; and wherein the secondary power source is configured to, when activated, power the low power component and a high power component; and a clock switch configured to provide a clock signal to the high power component based on the state of charge of the secondary power source.

According to various embodiments, there may be provided a wearable device including: a low power component; a high power component; and a power supply circuit including: a power switch configured to activate one of a primary power source or a secondary power source based on a state of charge of the secondary power source; wherein the primary power source is configured to, when activated, power a low power component; and wherein the secondary power source is configured to, when activated, power the low power component and a high power component; and a clock switch configured to provide a clock signal to the high power component based on the state of charge of the secondary power source.

According to various embodiments, there may be provided a method for providing power supply to a wearable device, the method including: activating one of a primary power source or a secondary power source based on a state of charge of the secondary power source, using a power switching circuit; wherein when activated, the primary power source powers a low power component; and wherein when activated, the secondary power source power the low power component and a high power component; and providing a clock signal to the high power component based on the state of charge of the secondary power source, using a clock switch.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which.

DESCRIPTION

Figure 1:
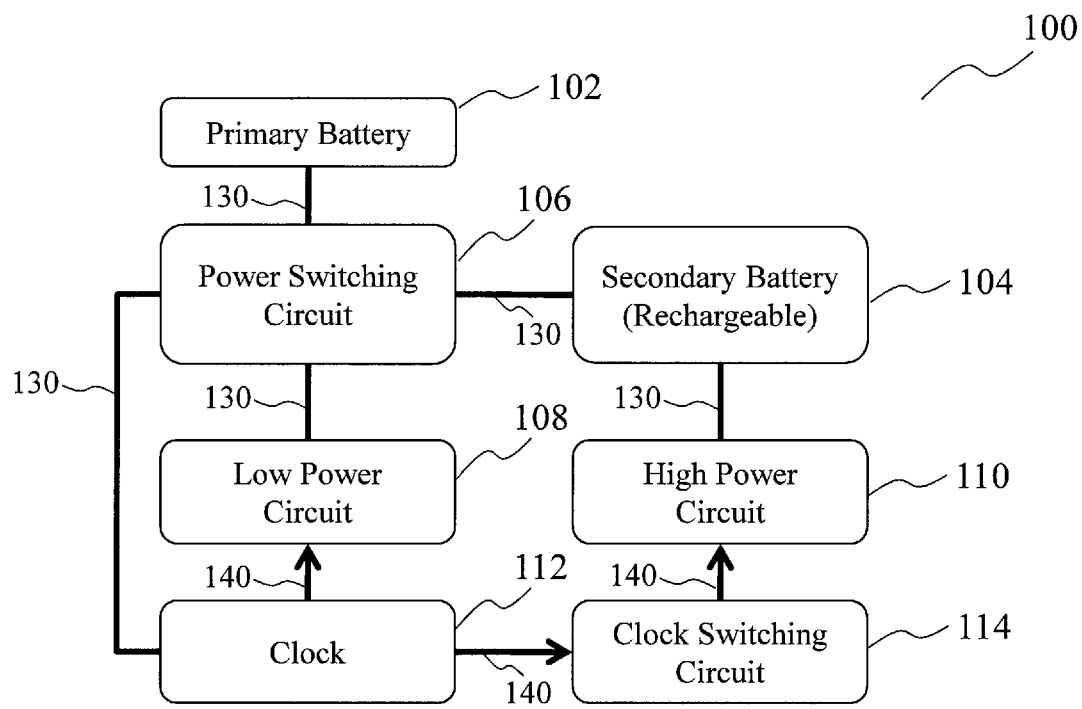
FIG. 1 shows a block diagram of a power supply circuit according to various embodiments.

Embodiments described below in context of the power supply circuits are analogously valid for the respective methods, and vice versa. Furthermore, it will be understood that the embodiments described below may be combined, for example, a part of one embodiment may be combined with a part of another embodiment.

It will be understood that any property described herein for a specific device may also hold for any device described herein. It will be understood that any property described herein for a specific method may also hold for any method described herein. Furthermore, it will be understood that for any device or method described herein, not necessarily all the components or steps described must be enclosed in the device or method, but only some (but not all) components or steps may be enclosed.

In an embodiment, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

The term "coupled" (or "connected") herein may be understood as electrically coupled or as mechanically coupled, for example attached or fixed, or just in contact without any fixation, and it will be understood that both direct coupling or indirect coupling (in other words: coupling without direct contact) may be provided.

The reference to any prior art in this specification is not, and should not be taken as an acknowledgement or any form of suggestion that the referenced prior art forms part of the common general knowledge in Australia (or any other country).

In order that the invention may be readily understood and put into practical effect, various embodiments will now be described by way of examples and not limitations, and with reference to the figures.

Wearable technology has been increasingly integrated into our daily lives. Today, wearable devices perform many different functions, ranging from telling time, providing telecommunications, playing audiovisual signals, monitoring health statistics to tracking our activities. Often, a single wearable device is able to perform multiple functions, so that a user need not carry many wearable devices with him. As a result, the power consumption rate of wearable devices may be considerably higher as compared to a single-function device such as a simple digital watch. At the same time, it is generally desirable for the wearable device to have an extended battery life so that it does not need to be frequently taken off from the user for charging. Therefore, there is a need for a power supply circuit that can provide uninterrupted power supply for extended time durations.

A wearable device may include a primary battery and a secondary battery. The primary battery may be used to supply power to electrical components that have low power requirements, also referred herein as low power components. The low power components may include for example, a timer or a clock. The electrical current consumption of the low power components may be less than 100 uA. The secondary battery may be used to supply power to electrical components that have high power requirements, also referred herein as high power components. The electrical current consumption of the high power components may be higher than 100 uA, for example as high as 200 mA, for example, in a range from about 100 uA to about 200 uA. The high power components may include, for example, display screens, sensors, processors, speakers, vibration motors, memories and wireless radio transceivers. The wireless radio transceivers may include for example, Global Positioning System transceivers, Bluetooth transceivers, Wi-Fi transceivers and mobile telecommunication transceivers. The sensors may include for example, gyroscope, accelerometer and thermometers. With the use of dual batteries, there is a risk of current leakage which may shorten the battery life of the wearable device. In order to provide an uninterrupted power supply for a longer time duration without the need to frequently recharge the batteries, a power supply circuit according to various embodiments may be provided. The power supply circuit may be especially beneficial to wearables with multiple microcontroller units (MCU). Such wearables or wearable devices may require constant uninterrupted power for ultra low power functions such as time keeping with a primary battery source and a secondary rechargeable battery for higher power functions such as Bluetooth radio, vibration motors and displays etc.

In the context of various embodiments, the phrase "timing signal" may be but is not limited to being interchangeably referred to as a "clock signal".

According to various embodiments, a wearable device may include a main circuit. The main circuit may include low power components and high power components. The wearable device may include a power switching circuit configured to switch the power supply of the low power components between a primary battery and a secondary battery, such that the low power components draw power from only one power source at any one time. The primary battery may be a non-rechargeable battery such as a coin cell. The secondary battery may be a re-chargeable battery source. The high power components may draw power only from the secondary battery. When the secondary battery is unavailable, the high power components may be switched off. When the secondary battery is available, the low power components may draw power from the secondary battery instead of the primary battery, thereby prolonging the battery life of the primary battery.

According to various embodiments, a wearable device may include a clock and a clock switching circuit. The clock may be configured to generate a timing signal. The timing signal may be used to synchronize the active electronic components in the wearable device. The active electronic components may include, for example, microcontroller units and integrated circuits. When the secondary battery is unavailable, the clock switching circuit may be configured to disconnect the timing signal from the high power components which are dependent on the secondary battery. This may remove unnecessary load on the clock and also minimize cross leakage currents between the high power components and the low power components when the secondary battery is unavailable. The clock may include an internal voltage regulator in order to maintain the timing signal throughout the switching between the primary battery and the secondary battery, even when there is a voltage difference between the primary battery and the secondary battery. The internal power rail of the clock may be regulated to a constant voltage that is lower than either of the power sources to ensure that the internal oscillating circuit will not lose timing accuracy due to fluctuating voltages. By minimizing current leakage, the overall efficiency of the main circuit may be improved.

FIG. 1 shows a block diagram 100 of a power supply circuit according to various embodiments. The power supply circuit may include a primary battery 102 and a secondary battery 104. The secondary battery 104 may be a rechargeable battery, and may have a higher capacitance or electric charge storage capacity, as compared to the primary battery 102. The secondary battery 104 may be configured to supply a larger amount of electrical power than the primary battery 102. The power supply circuit may further include a power switching circuit 106 that may be coupled to each of the primary battery 102 and the secondary battery 104. The power supply circuit may further include a low power circuit 108 and a high power circuit 110. The low power circuit 108 may include a low power line. The low power circuit 108 may be an essential bus such that the low power circuit 108 is always powered. The low power circuit 108 may supply power to electrical components that have lower power requirements as compared to the electrical components that are supplied power by the high power circuit 110. The high power circuit 110 may include a high power line. The high power circuit 110 may be a non-essential bus such that the high power circuit 110 may be disconnected when the battery level is running low. The power switching circuit 106 may be configured to connect the low power circuit 108 to one of the primary battery 102 or the secondary battery 104. The power supply circuit may further include a clock 112. The clock 112 may be an oscillator, for example an ultra low-power oscillator. The clock 112 may include a microelectromechanical systems (MEMS) circuit. The clock 112 may be configured to provide a clock signal. The clock circuit 112 may receive power from either the primary battery 102 or the secondary battery 104 via the power switching circuit. The clock circuit 112 may be part of the low power circuit 108. The clock signal may be provided to the low power circuit 108 and the high power circuit 110 for synchronization. To maintain a constant oscillation frequency, the clock 112 may include a voltage regulator configured to provide a constant regulated voltage as the received voltage. The constant regulated voltage may be lower than the voltage of the primary battery 102 and the voltage of the secondary battery 104. The lines 130 may indicate power lines or electrical coupling. The arrows 140 may indicate clock signals.

Figure 2:
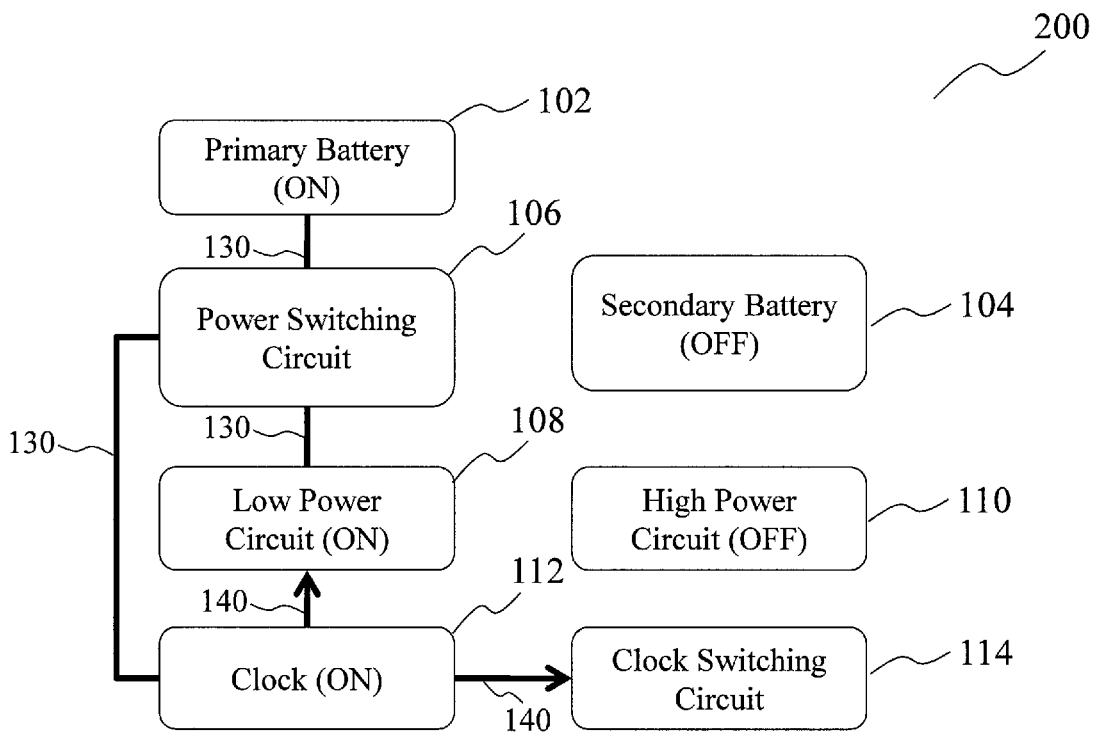
FIG. 2 shows a block diagram of the power supply circuit of FIG. 1 when the secondary battery is unavailable.

FIG. 2 shows a block diagram 200 of the power supply circuit of FIG. 1 when the secondary battery 104 is unavailable, or in other words, depleted. The state of charge of the secondary battery 104 may be used as a measure of whether the secondary battery 104 is available. A depletion threshold may be defined as the level below which the secondary battery 104 is incapable of providing power. The depletion threshold may be a percentage. The state of charge of the secondary battery 104 may be compared against the depletion threshold, to determine whether the secondary battery 104 is available. For example, the secondary battery 104 may be depleted if the state of charge does not exceed the depletion threshold. When the secondary battery 104 is depleted, the power switching circuit 106 may deactivate the secondary battery 104 to "OFF" state and activate the primary battery 102 to "ON" state. The power switching circuit 106 may route the electric power from the primary battery 102 to the low power circuit 108. The clock circuit 112 may also receive electric power from the primary battery 102. The power switching circuit 106 may at least one of decouple from the secondary battery 104 or decouple the secondary battery 104 from the high power circuit 110, while continuing to connect the primary battery 102 to the low power circuit 108. The clock switch circuit 114 may disable the clock signal generated by the clock 112 from being sent to the high power circuit 110 which is now in the "OFF" state as its power source is deactivated. By disabling the transmission of clock signal to the high power circuit 110, the load on the clock 112 may be reduced. Cross leakage currents between the high power circuit 110 and the low power circuit 108 may also be minimized.

Figure 3:
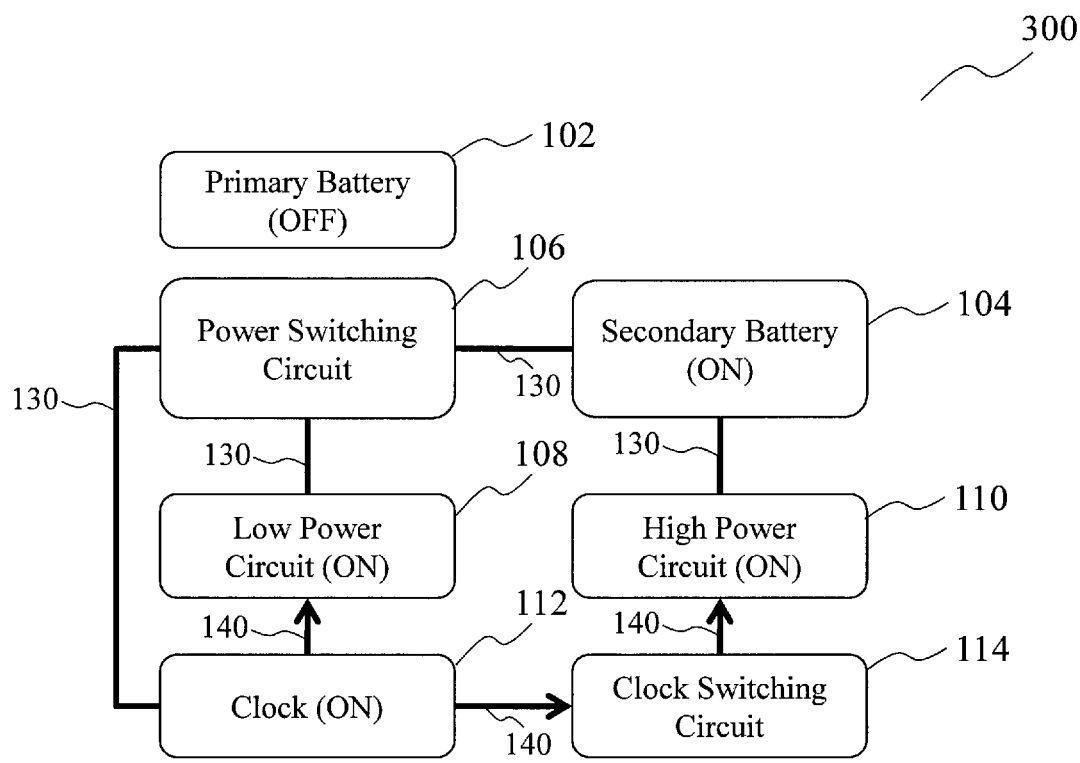
FIG. 3 shows a block diagram of the power supply circuit of FIG. 1 when the secondary battery is available.

FIG. 3 shows a block diagram 300 of the power supply circuit of FIG. 1 when the secondary battery 104 is available. The secondary battery 104 may be available when its state of charge exceeds a depletion threshold. The depletion threshold of a battery may indicate a charge level below which, the battery is depleted or is incapable of supplying power. When the secondary battery 104 is available, the power switching circuit 106 may route electric power from the secondary battery 104 to each of the low power circuit 108 and the high power circuit 110. The clock circuit 112 may also receive electric power from the secondary battery 104. The primary battery 102 may be deactivated, in other words, disconnected to isolate the primary battery 102 from the low power circuit 108 and the high power circuit 110 to conserve battery power in the primary battery 102. The clock switch circuit 114 may enable the clock signal to be provided to the high power circuit 110. The power switching circuit 106 may maximize the operational life of the primary battery 102 by switching power usage of the low power circuit 108 to the secondary battery 104 when the secondary battery 104 is available for normal higher power operations required by the high power circuit 110. The power switching circuit 106 may switch back to the primary battery source to power the low power components for low power operations (e.g. time keeping) when the secondary battery source is switched off or depleted. Besides auto selecting battery source, using only one battery source at any time may minimize steady state leakages that will arise from using two battery sources simultaneously. This may result in higher overall power efficiency for maximum battery life.

Figure 4:
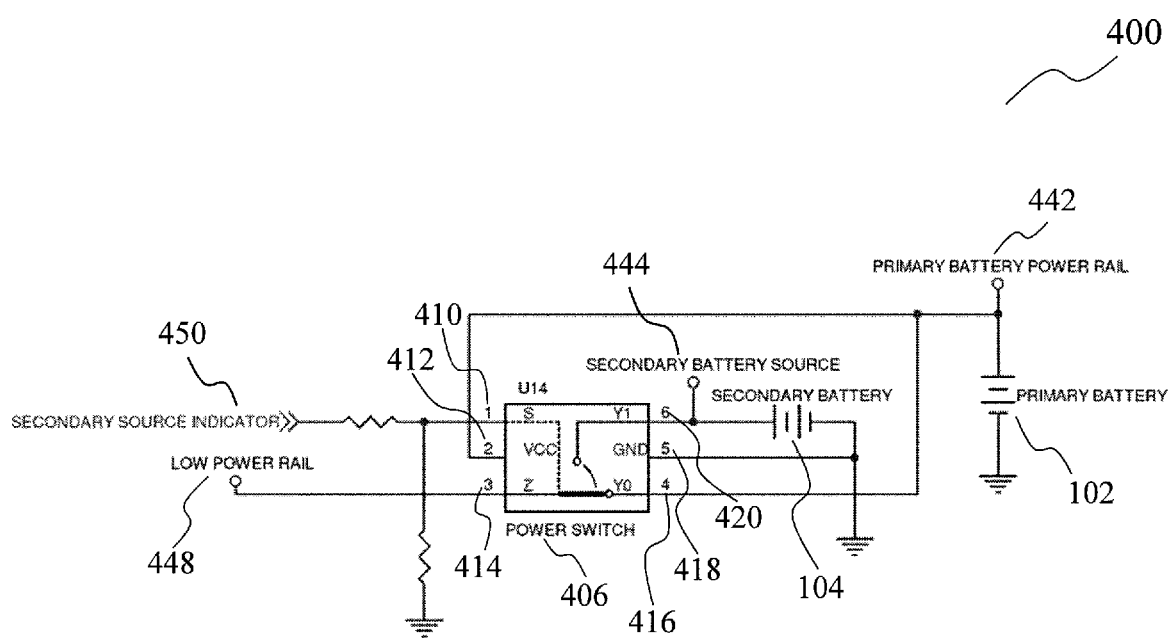
FIG. 4 shows a schematic diagram showing a power switching circuit according to various embodiments.

FIG. 4 shows a schematic diagram 400 showing a power switching circuit according to various embodiments. The power switching circuit shown herein may be the power switching circuit 106. The power switching circuit may include a power switch 406. The power switch 406 may include a first power switch connector 410, a second power switch connector 412, a third power switch connector 414, a fourth power switch connector 416, a fifth power switch connector 418 and a sixth power switch connector 420. The first power switch connector 410 may be coupled to a secondary source indicator 450 (indicated as "S"). The secondary source indicator 450 may provide a control signal based on a state of the secondary battery 104. The secondary source indicator 450 may provide the control signal by comparing the state of charge of the secondary battery 104 to a predetermined depletion threshold. The control signal may also be referred herein as an indicator signal. The power switch 406 may be configured to operate based on the control signal. The power switch 406 may be powered by a power source (indicated as "VCC"). The power switch 406 may be connected to VCC via the second power switch connector 412. The power source may be the primary battery 102. The third power switch connector 414 may be a terminal indicated as "Z", coupled to a low power rail 448. The low power rail 448 may be coupled to at least one low power component. The fourth power switch connector 416 may be a terminal indicated as "Y0", coupled to the primary battery 102 or the primary battery power rail 442. The fifth power switch connector 418 may be a terminal coupled to electrical ground, indicated as "GND". The sixth power switch connector 420 may be a terminal indicated as "Y1", coupled to the secondary battery 104 or the secondary battery source 444. When the control signal from the secondary source indicator 450 indicates that the secondary battery 104 is available, the power switch 406 connects the third power switch connector 414 to the sixth power switch connector 420, so that the low power rail is powered by the secondary battery 104. When the control signal indicates that the secondary battery 104 is depleted, the power switch 406 flips from Y1 to Y0, causing the third power switch connector 414 to be connected to the fourth power switch connector 416, as well as to be disconnected from the sixth power switch connector 420. In other words, the low power rail 448 is now powered by the primary battery 102 and is now disconnected from the secondary battery 104. The secondary battery 104 may be connected to a high power rail regardless of the state of charge of the secondary battery 104. The secondary battery 104 may also be disconnected from the high power rail when the secondary battery 104 is depleted. The high power rail may be coupled to at least one high power component.

Figure 5:
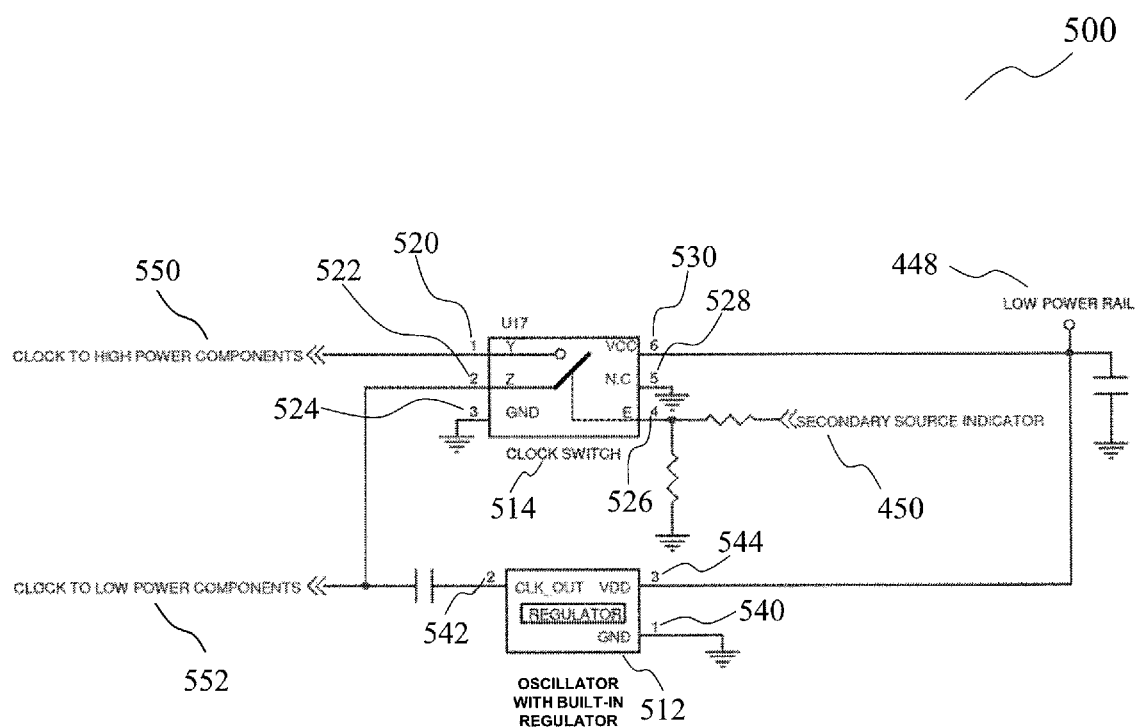
FIG. 5 shows a schematic of a clock switching circuit according to various embodiments.

FIG. 5 shows a schematic diagram 500 of a clock switching circuit according to various embodiments. The clock switching circuit may be the clock switching circuit 114. The clock switching circuit may include a clock 512 and a clock switch 514. The clock 512 may be an oscillator and may be a MEMS oscillator. The clock 512 may include a built-in voltage regulator. The clock 512 may have a first clock connector 540 connected to ground. The clock 512 may have a second clock connector 542 that carries the output clock signal of the clock 512. The output clock signal may be indicated herein as "CLK_OUT". The second clock connector 542 may be coupled to the low power components 552.

The clock 512 may have a third clock connector 544, also indicated herein as VDD, which serves to provide power to the clock 512. VDD may be provided by the low power rail 448. In other words, the clock 512 may be one of the low power components. The voltage regulator may convert the power received from the low power rail into a constant voltage that is lower than both the primary battery 102 and the secondary battery 104. The clock switch 514 may include a first clock switch connector 520, a second clock switch connector 522, a third clock switch connector 524, a fourth clock switch connector 526, a fifth clock switch connector 528 and a sixth clock switch connector 530. The first clock switch connector 520 may be a terminal indicated as "Y", coupled to the high power components 550. The second clock switch connector 522 may be a terminal indicated as "Z", coupled to the second clock connector 532. The third clock switch connector 524 may be coupled to electrical ground. The fourth clock switch connector 526 may be coupled to the secondary source indicator 450. The secondary source indicator 450 may generate the control signal which may be used to control the clock switch 514. The fifth clock switch connector 528, indicated as "N.C.", may be the not-connected, floating pin. The fifth clock switch connector 528 may be connected to electrical ground. The sixth clock switch connector 530, indicated as "VCC", may be coupled to the low power rail 448. In other words, the clock switch 514 may receive electrical power from the low power rail 448. When the control signal from the secondary source indicator 450 indicates that the secondary battery 104 is available, the clock switch 514 may connect the first clock switch connector 520 to the second clock switch connector 522, i.e. connect Y and Z, so that the output clock signal CLK_OUT is provided to the high power components 550. When the control signal indicates that the secondary battery 104 is unavailable, the clock switch 514 may disconnect the first clock switch connector 520 from the second clock switch connector 522, i.e. disconnect Y and Z. When Y is disconnected from Z, the high power components 550 are disconnected from the clock 512 and therefore, do not receive the output clock signal.

Figure 6:
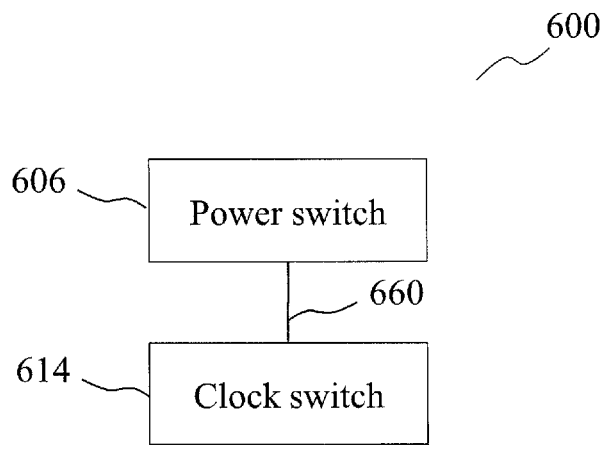
FIG. 6 shows a conceptual diagram of a power supply circuit according to various embodiments.

FIG. 6 shows a conceptual diagram of a power supply circuit 600 according to various embodiments. The power supply circuit 600 may include a power switch 606 and a clock switch 614. The power switch 606 may be configured to activate one of a primary power source or a secondary power source based on a state of charge of the secondary power source. The primary power source may be configured to, when activated, power a low power component. The secondary power source may be configured to, when activated, power the low power component and a high power component. The clock switch 614 may be configured to provide a clock signal to the high power component based on the state of charge of the secondary power source. The power switch 606 and the clock switch 614 may be coupled with each other, like indicated by line 660, for example electrically coupled, for example using a line or a cable, and/or mechanically coupled.

In other words, according to various embodiments, a power supply circuit 600 may include a power switch 606. The power switch 606 may be similar or identical to the power switching circuit 106. The power switch 606 may include the power switch 406. The power switch 606 may be configured to activate one of a primary power source or a secondary power source based on a state of charge of the secondary power source. The primary power source may power a low power component when activated by the power switch 606. The secondary power source may power both the low power component and the high power component when activated by the power switch 606. In other words, at any one time, either the primary power source or the secondary power source is active. The primary power source and the secondary power source may not simultaneously operate. Whether the primary power source is active or the secondary power source is active depends on the state of charge, in other words, an amount of charge remaining in the secondary power source. The power switch 606 may activate the secondary power source when the state of charge of the secondary power source exceeds a predetermined threshold, and may activate the primary power source when the state of charge of the secondary power source does not exceed the predetermined threshold. The predetermined threshold may be a percentage of charge in the secondary battery 104, below which the secondary battery 104 is depleted or incapable of supplying power. The default choice of power source may be the secondary power source such that the primary power source is only activated when the secondary power source is depleted. When the secondary power source is active, both the low power component and the high power component may be supplied with electrical power. When the primary power source is active, only the low power component may be supplied with electrical power. The power supply circuit 600 may further include a clock switch 614. The clock switch 614 may be identical to, or similar to, the clock switching circuit 114. The clock switch 614 may include the clock switch 514. The clock switch 614 may provide a clock signal to the high power component based on the amount of charge remaining in the secondary power source, i.e. the state of charge of the secondary power source. The clock signal may be provided to the high power component when the state of charge of the secondary power source exceeds the predetermined threshold. The clock signal may be the output clock signal CLK_OUT indicated in FIG. 5. The clock switch 614 may provide the clock signal to the low power component all the time, regardless of the state of charge of the secondary power source. The clock switch 614 may deny the high power component of the clock signal when the secondary power source is depleted, since the high power component may not be powered when the secondary power source is depleted.

Figure 7:
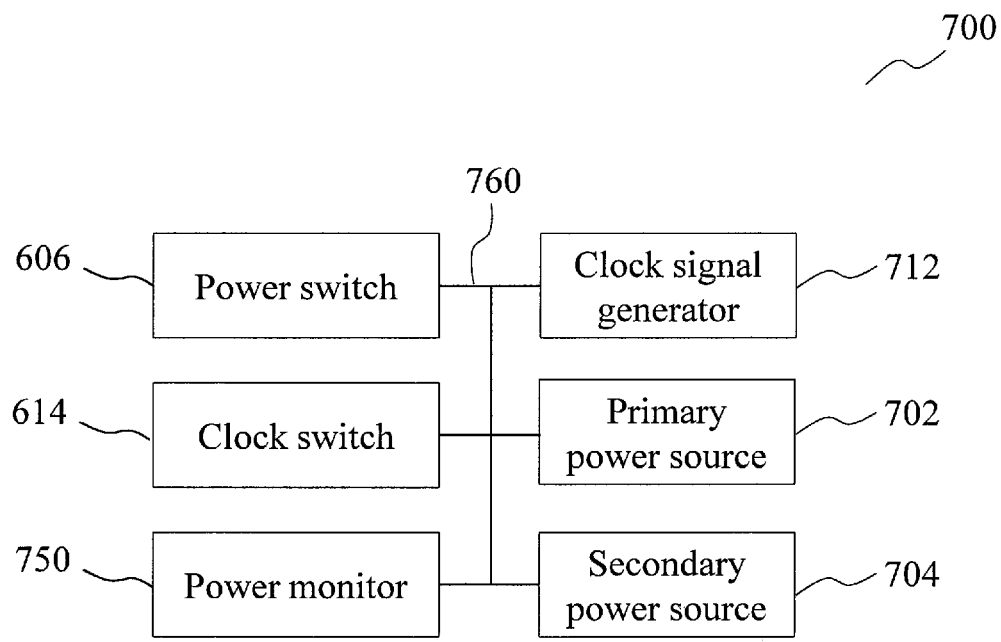
FIG. 7 shows a conceptual diagram of a power supply circuit according to various embodiments.

FIG. 7 shows a conceptual diagram of a power supply circuit 700 according to various embodiments. The power supply circuit 700 may be similar to the power supply circuit 600 in that it may include the power switch 606 and the clock switch 614. The power supply circuit 700 may further include the primary power source 702 and the secondary power source 704. The primary power source 702 may include the primary battery 102. The secondary power source 704 may include the secondary battery 104. The secondary power source 704 may be a rechargeable battery. The voltage of the primary power source 702 may be lower than the voltage of the secondary power source 704. The power supply circuit 700 may further include a power monitor 750. The power monitor 750 may be configured to generate an indicator signal indicative of whether the state of charge of the secondary power source 704 exceeds a predetermined threshold and may be further configured to provide the indicator signal to at least one of the power switch 606 or the clock switch 614. The indicator signal may be the control signal generated by the secondary source indicator 450. The predetermined threshold may be representative of a charge level below which, the secondary power source is depleted or is incapable of supplying power. The predetermined threshold may be the depletion threshold. The power switch 606 may be configured to activate one of the primary power source 702 or the secondary power source 704 based on the indicator signal. The power switch 606 may activate the primary power source 702 by connecting it to the low power component. The power switch 606 may activate the secondary power source 704 by connecting it to at least one of the low power component and the high power component. The clock switch 614 may also be configured to provide the clock signal to the high power component based on the indicator signal. The power supply circuit 700 may further include a clock signal generator 712 configured to generate the clock signal. The clock signal generator 712 may be the clock 112 or the oscillator 512. The clock signal generator 712 may be an ultra low-power oscillator. The electrical current consumption of the ultra low-power oscillator may be less than 100 uA, for example, in a range of about 100 nA to about 100 uA, for example, in a range of about 100 nA to about 10 uA, for example in a range from about 100 nA to about 1 uA. The clock signal generator 712 may include a MEMS oscillator. The clock switch 614 may cause the clock signal to be provided to the high power component, by connecting the clock signal generator 712 to the high power component. The power switch 606, the clock switch 614, the power monitor 750, the clock signal generator 712, the primary power source 702 and the secondary power source 704 may be coupled with each other, like indicated by lines 760, for example electrically coupled, for example using a line or a cable, and/or mechanically coupled.

Figure 8:
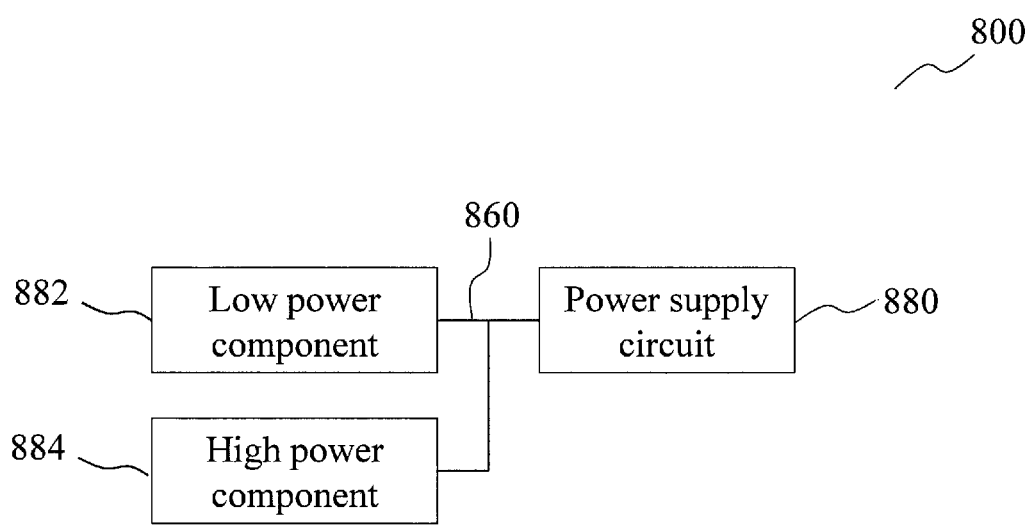
FIG. 8 shows a conceptual diagram of a wearable device according to various embodiments.

FIG. 8 shows a conceptual diagram of a wearable device 800 according to various embodiments. The wearable device 800 may be one of a smart watch, a fitness wristband, an activity tracker, a health monitor, a medical implant, a headphone, a media player or a mobile communication device. The wearable device 800 may include a low power component 882 and a high power component 884. The low power component 882 may include a time-keeping module. It may be desirable for the low power component 882 to be continuously powered. The low power component 882 may be always switched on. The high power component 884 may include at least one of a MCU or an integrated circuit. The high power component 884 may also include a display screen, for example light emitted diode display. The high power component 884 may be operated on demand, for example, when the user enters inputs or activates the wearable device to perform certain functions. The wearable device 800 may also include a power supply circuit 880. The low power circuit 108 may be the low power component 882, or may include the low power component 882. The high power circuit 110 may be the high power component 884, or may include the high power component 884. The power supply circuit 880 may include the power supply circuit 600 or the power supply circuit 700. The wearable device 800 may include a dual-battery circuit.

Figure 9:
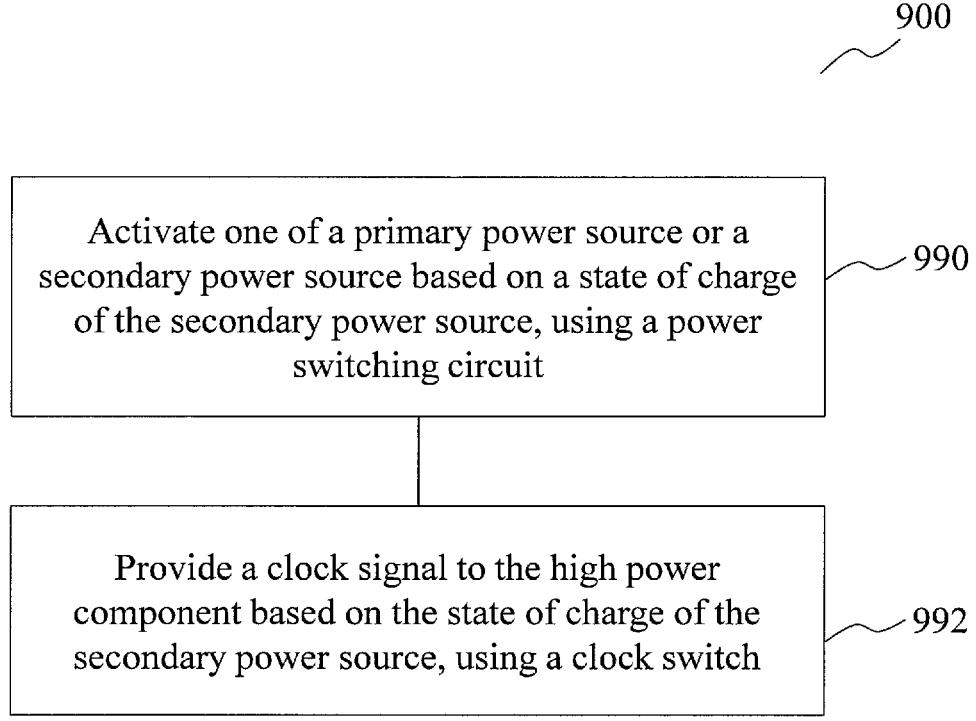
FIG. 9 shows a flow diagram illustrating a method for providing power supply to a wearable device according to various embodiments.

FIG. 9 shows a flow diagram 900 illustrating a method for providing power supply to a wearable device, such as the wearable device 800, according to various embodiments. The method may include 990, in which one of a primary power source or a secondary power source is activated based on a state of charge of the secondary power source, using a power switching circuit. When activated, the primary power source may power a low power component. When activated, the secondary power source may power the low power component, as well as a high power component. The method may further include 992, in which a clock signal may be provided to the high power component based on the state of charge of the secondary power source, using a clock switch.

The following examples pertain to further embodiments.

Example 1 is a power supply circuit including: a power switch configured to activate one of a primary power source or a secondary power source based on a state of charge of the secondary power source; wherein the primary power source is configured to, when activated, power a low power component; and wherein the secondary power source is configured to, when activated, power the low power component and a high power component; and a clock switch configured to provide a clock signal to the high power component based on the state of charge of the secondary power source.

In example 2, the subject-matter of example 1 can optionally include a power monitor configured to generate an indicator signal indicative of whether the state of charge of the secondary power source exceeds a predetermined threshold and further configured to provide the indicator signal to at least one of the power switch or the clock switch.

In example 3, the subject-matter of example 2 can optionally include that the power switch is configured to activate one of the primary power source or the secondary power source based on the indicator signal.

In example 4, the subject-matter of example 2 or example 3 can optionally include that the clock switch is configured to provide the clock signal to the high power component based on the indicator signal.

In example 5, the subject-matter of any one of examples 1 to 4 can optionally include a clock signal generator configured to generate the clock signal.

In example 6, the subject-matter of example 5 can optionally include that the clock switch is configured to provide the clock signal to the high power component by connecting the clock signal generator to the high power component.

In example 7, the subject-matter of example 5 or example 6 can optionally include that the clock signal generator is configured to provide the clock signal to the low power component regardless of the state of charge of the secondary power source.

In example 8, the subject-matter of any one of examples 5 to 7 can optionally include that the clock signal generator includes an oscillator.

In example 9, the subject-matter of example 8 can optionally include that the clock signal generator further includes a voltage regulator.

In example 10, the subject-matter of example 9 can optionally include that the voltage regulator is configured to provide a constant regulated voltage to the oscillator.

In example 11, the subject-matter of example 10 can optionally include that the constant regulated voltage is lower than each of a voltage of the primary power source and a voltage of the secondary power source.

In example 12, the subject-matter of any one of examples 8 to 11 can optionally include that the oscillator is an ultra low-power oscillator.

In example 13, the subject-matter of any one of examples 1 to 12 can optionally include that the power switch is configured to activate the secondary power source when the state of charge of the secondary power source exceeds a predetermined threshold and wherein the power switch is configured to activate the primary power source to the component circuit when the state of charge of the secondary power source does not exceed the predetermined threshold.

In example 14, the subject-matter of any one of examples 1 to 13 can optionally include that the clock switch is configured to provide the clock signal to the high power component when the state of charge of the secondary power source exceeds a predetermined threshold.

In example 15, the subject-matter of any one of examples 1 to 14 can optionally include that the power switch is configured to activate one of the primary power source or the secondary power source by connecting the one of the primary power source or the secondary power source to the low power component.

In example 16, the subject-matter of any one of examples 1 to 15 can optionally include that the secondary power source is connected to the high power component regardless of the state of charge of the secondary power source.

In example 17, the subject-matter of any one of examples 1 to 16 can optionally include that each of the primary power source and the secondary power source is a battery.

In example 18, the subject-matter of any one of examples 1 to 17 can optionally include that the secondary power source is a rechargeable battery.

In example 19, the subject-matter of any one of examples 1 to 18 can optionally include that a voltage of the primary power source is lower than a voltage of the secondary power source.

In example 20, the subject-matter of any one of examples 1 to 19 can optionally include the primary power source; and the secondary power source.

Example 21 is a wearable device including: a low power component; a high power component; and a power supply circuit including: a power switch configured to activate one of a primary power source or a secondary power source based on a state of charge of the secondary power source; wherein the primary power source is configured to, when activated, power a low power component; and wherein the secondary power source is configured to, when activated, power the low power component and a high power component; and a clock switch configured to provide a clock signal to the high power component based on the state of charge of the secondary power source.

In example 22, the subject-matter of example 21 can optionally include that the low power component includes a time-keeping module.

In example 23, the subject-matter of example 21 or example 22 can optionally include that the high power component includes at least one of a microcontroller unit or an integrated circuit.

Example 24 is a method for providing power supply to a wearable device, the method including: activating one of a primary power source or a secondary power source based on a state of charge of the secondary power source, using a power switching circuit; wherein when activated, the primary power source powers a low power component; and wherein when activated, the secondary power source power the low power component and a high power component; and providing a clock signal to the high power component based on the state of charge of the secondary power source, using a clock switch.

While embodiments of the invention have been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced. It will be appreciated that common numerals, used in the relevant drawings, refer to components that serve a similar or the same purpose.

The invention claimed is:

1. A power supply circuit comprising:
a power switch configured to activate one of a primary power source or a secondary power source based on a state of charge of the secondary power source;
wherein the primary power source is configured to, when activated, power a low power component having a clock signal generator configured to generate a clock signal; and
wherein the secondary power source is configured to, when activated, power the low power component having the clock signal generator and a high power component; and
a clock switch configured to provide the clock signal from the clock signal generator of the low power component to the high power component based on the state of charge of the secondary power source;
wherein, when the state of charge of the secondary power source is below a predetermined threshold, (i) the power switch is configured to deactivate the secondary source and activate the primary power source and (ii) the clock switch is configured to disconnect the clock signal generator from the high power component.

2. The power supply circuit of claim 1, further comprising:
a power monitor configured to generate an indicator signal indicative of whether the state of charge of the secondary power source exceeds the predetermined threshold and further configured to provide the indicator signal to at least one of the power switch or the clock switch.

3. The power supply circuit of claim 2, wherein the power switch is configured to activate one of the primary power source or the secondary power source based on the indicator signal.

4. The power supply circuit of claim 2, wherein the clock switch is configured to provide the clock signal to the high power component based on the indicator signal.

5. The power supply circuit of claim 1, wherein the clock switch is configured to provide the clock signal to the high power component by connecting the clock signal generator to the high power component.

6. The power supply circuit of claim 1, wherein the clock signal generator comprises an oscillator.

7. The power supply circuit of claim 1, wherein the power switch is configured to activate the secondary power source when the state of charge of the secondary power source exceeds the predetermined threshold.

8. The power supply circuit of claim 1, wherein the clock switch is configured to provide the clock signal to the high power component when the state of charge of the secondary power source exceeds the predetermined threshold.

9. The power supply circuit of claim 1, wherein the power switch is configured to activate one of the primary power source or the secondary power source by connecting the one of the primary power source or the secondary power source to the low power component.

10. The power supply circuit of claim 1, wherein each of the primary power source and the secondary power source is a battery.

11. The power supply circuit of claim 1, wherein the secondary power source is a rechargeable battery.

12. The power supply circuit of claim 1, wherein a voltage of the primary power source is lower than a voltage of the secondary power source.

13. The power supply circuit of claim 1, further comprising:
- the primary power source; and
- the secondary power source.

14. A wearable device comprising:
- a low power component having a clock signal generator configured to generate a clock signal;
- a high power component; and
- a power supply circuit comprising:
    - a power switch configured to activate one of a primary power source or a secondary power source based on a state of charge of the secondary power source;
    - wherein the primary power source is configured to, when activated, power the low power component having the clock signal generator; and
    - wherein the secondary power source is configured to, when activated, power the low power component having the clock signal generator and the high power component; and
    - a clock switch configured to provide the clock signal from the clock signal generator of the low power component to the high power component based on the state of charge of the secondary power source;
    - wherein, when the state of charge of the secondary power source is below a predetermined threshold, (i) the power switch is configured to deactivate the secondary source and activate the primary power source and (ii) the clock switch is configured to disconnect the clock signal generator from the high power component.

15. The wearable device of claim 14, wherein the low power component comprises a time-keeping module.

16. The wearable device of claim 14, wherein the high power component comprises at least one of a microcontroller unit or an integrated circuit.

17. A method for providing power supply to a wearable device, the method comprising:
- activating one of a primary power source or a secondary power source based on a state of charge of the secondary power source, using a power switching circuit;
- wherein when activated, the primary power source powers a low power component having a clock signal generator configured to generate a clock signal; and
- wherein when activated, the secondary power source power the low power component having the clock signal generator and a high power component; and
- providing the clock signal from the clock signal generator of the low power component to the high power component based on the state of charge of the secondary power source, using a clock switch;
- wherein, when the state of charge of the secondary power source is below a predetermined threshold, (i) the power switching circuit deactivates the secondary power source and activates the primary power source and (ii) the clock switch disconnects the clock signal generator from the high power component.

* * * * *